Figure 5:
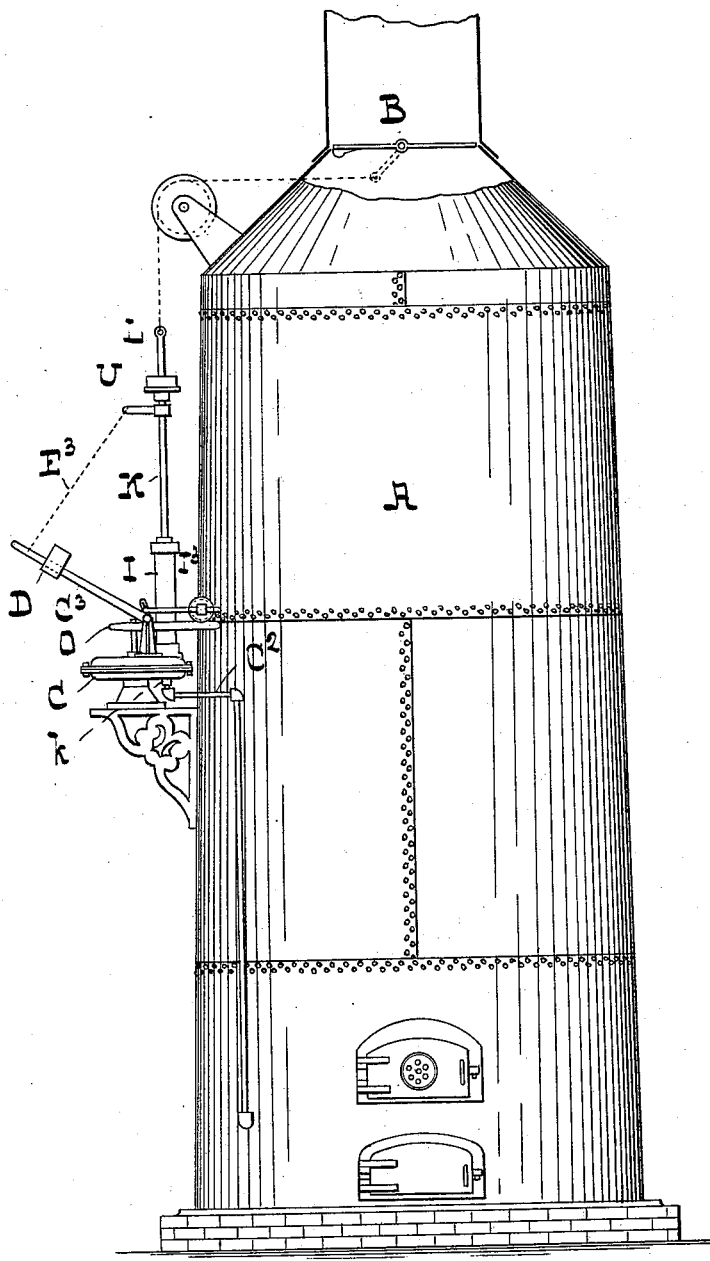

(No Model.) 3 Sheets—Sheet 1.
G. R. HOUSE.
APPARATUS FOR CONTROLLING ADMISSION OF AIR TO FURNACES.
No. 558,493. Patented Apr. 21, 1896.
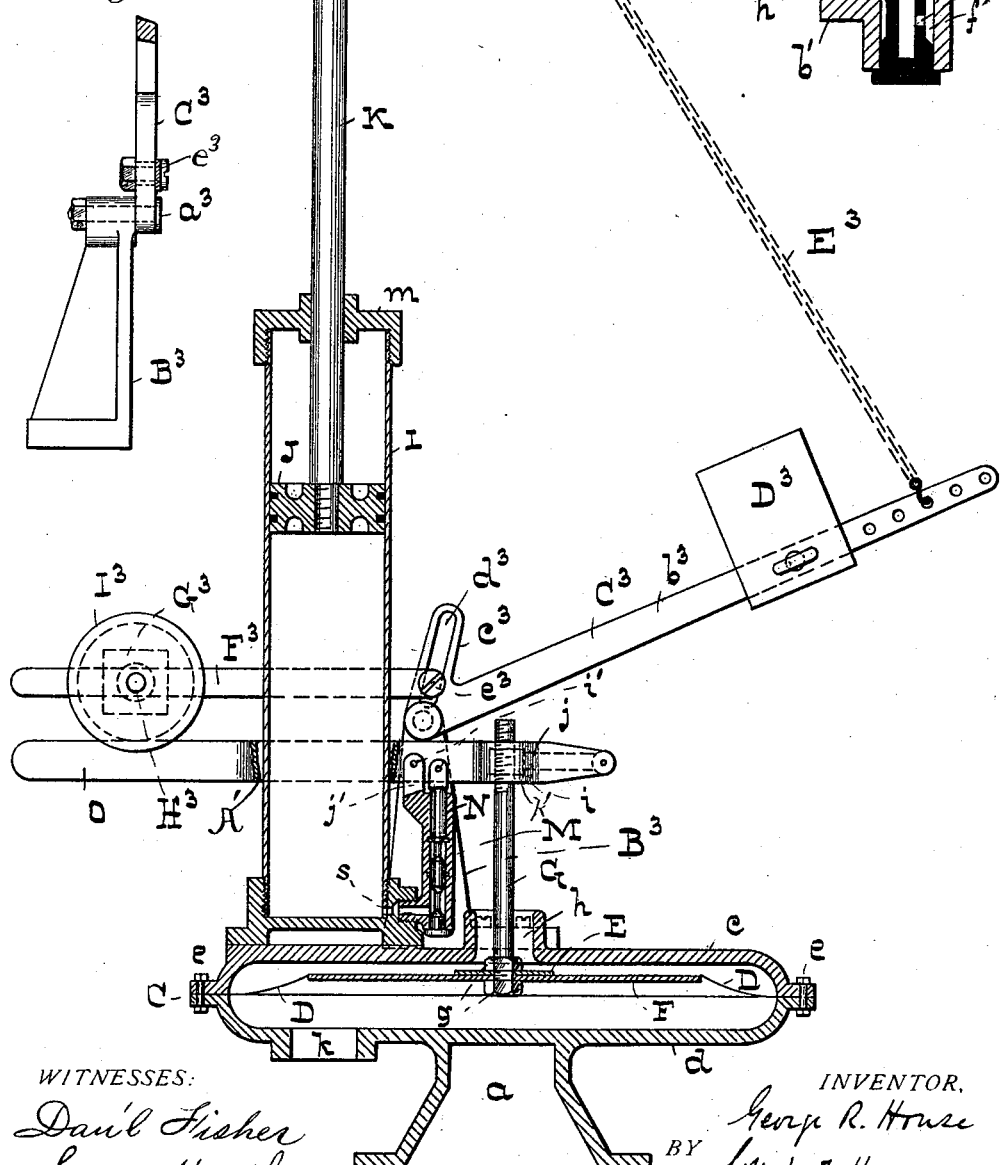
WITNESSES:
Dan'l Fisher
George Hemsley
INVENTOR,
George R. House
BY
W. J. Howard,
ATTORNEYS.

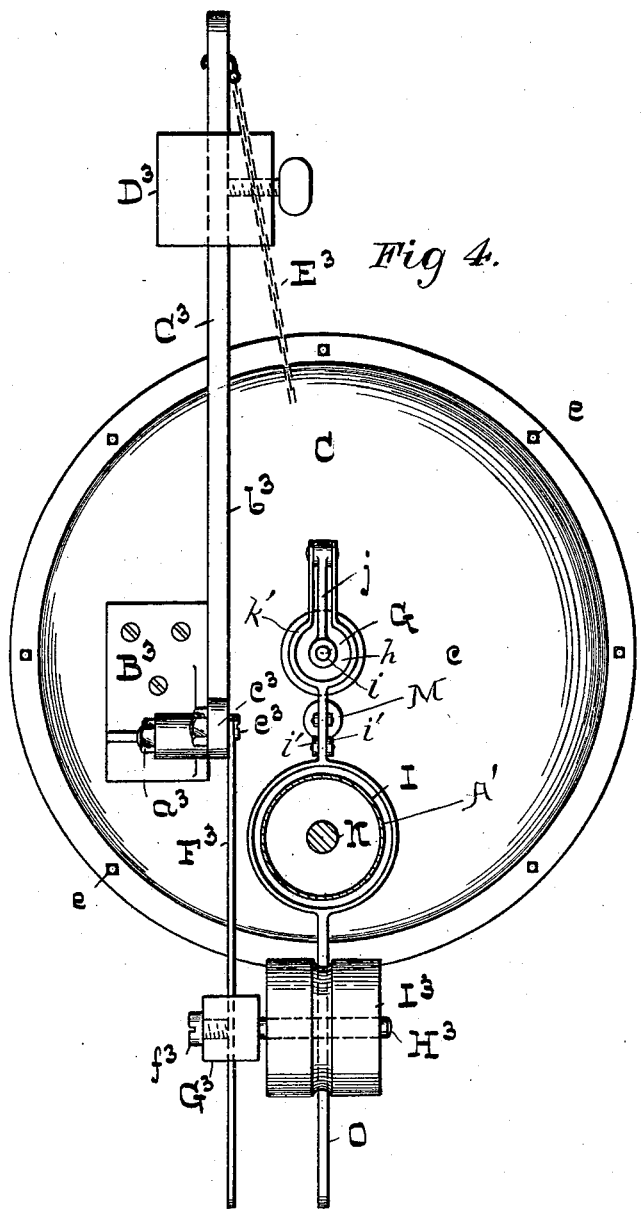

(No Model.) 3 Sheets—Sheet 3.
G. R. HOUSE.
APPARATUS FOR CONTROLLING ADMISSION OF AIR TO FURNACES.
No. 558,493. Patented Apr. 21, 1896.

UNITED STATES PATENT OFFICE.

GEORGE ROBERT HOUSE, OF BALTIMORE, MARYLAND.

APPARATUS FOR CONTROLLING ADMISSION OF AIR TO FURNACES.

SPECIFICATION forming part of Letters Patent No. 558,493, dated April 21, 1896.

Application filed March 4, 1895. Serial No. 540,391. (No model.)

*To all whom it may concern:*

Be it known that I, GEORGE ROBERT HOUSE, of the city of Baltimore, State of Maryland, have invented certain Improvements in Apparatus for Controlling the Admission of Air to Furnaces, of which the following is a specification.

This invention is an improvement of the invention shown and described in Letters Patent No. 515,377, granted on the 27th day of February, 1894, to George L. Thiell for improvements in apparatus for controlling the admission of air to furnaces, to which reference should be made.

In the said patented invention is employed a box containing a diaphragm, one side of which is exposed to the gases in the furnace and the other to the atmosphere.

The position of the diaphragm in the said box depends, primarily, on the relative pressures of the gases in the furnace and the outer air, and the diaphragm is used to operate a valve which controls the admission of water under pressure to a cylinder having a piston and rod which, in connection with other devices, effect the movement of the chimney-damper, as fully described in the said Letters Patent.

The central stem of the diaphragm is connected by a spiral spring and chain to the circumference of a small pulley on a shaft having a constant position, and on the same shaft is another and larger pulley, to the periphery of which is attached another chain which is wound around the said pulley and connected to an arm projecting from the piston-rod of the motor-cylinder.

Any downward movement of the diaphragm effected by a decrease in pressure of the gases under it causes the valve to open and thereby admit water under pressure to the under side of the piston, which then rises and effects an opening of the chimney-damper; but in the elevation of the piston-rod the tension of the spring is increased by the winding of the chain around the small pulley, and the diaphragm is lifted a little higher than it would be if influenced by the pressure under it alone, and the valve is moved so as to shut off the entering water and prevent the discharge of that already in the cylinder. By this means the damper is held in its new position until a further change in the relative pressures of the gases and air takes place; but springs are not to be entirely depended upon where very nice adjustment is required, for the reasons that they become weak with use and alter in degree of tension by atmospheric changes. The object of the present invention is to substitute for the spring and its connections devices which will effect the same theoretic effect and result as the spring, and not be liable to any deterioration by use or change in operation by varying atmospheric conditions. My invention therefore consists in an apparatus of the character described embodying a weight and a lever whereby the weight is variable in effect on the valve and which may be easily adjusted to suit all conditions, as will hereinafter fully appear.

Referring now to the drawings, forming a part hereof, Figure 1 is a vertical section of the principal parts of the patented apparatus affected by the present invention, together with my improvements. Figs. 2 and 3 are details of the apparatus, the latter being on an enlarged scale; and Fig. 4, a plan of the apparatus. Fig. 5 shows the apparatus on a reduced scale applied to a boiler.

Parts of the apparatus herein corresponding with those shown in the drawings forming a part of the said Letters Patent are designated by similar letters of reference.

C is a box in two parts or sections, having a suitable stand $a$, whereby it is supported. Between the two parts or sections $c$ and $d$ of the box C is a flexible diaphragm D, held in place by bolts $e$, which also hold the two sections $c$ and $d$ together. This diaphragm is made of any suitable material, but cotton duck treated with rubber is preferred.

E and F are circular metallic plates secured, respectively, to the top and bottom of the diaphragm D.

G is a vertical stem held to the plates E and F, and also to the diaphragm D, by the nuts $g$. This stem passes through an aperture $h$ in the top section $c$ of the box C, and its head is provided with a collar $i$, having an arm $j$ extending laterally from one side thereof.

The lower section of the box C is connected with the interior of the furnace of the boiler A, or to the combustion-chamber thereof, by a pipe $C^2$, which is attached to the nozzle $k$. (See Fig. 5.)

I is a steam, or, preferably, a water-cylinder, erected on the top of the section $c$ of the box C.

J is a piston in the cylinder I, having a rod K, which passes through the cylinder-head $m$ at the upper end of the cylinder. This piston-rod has appliances similar to those shown in the said Letters Patent, whereby in the stroke of the piston and its rod the damper B is operated.

L is a weight seated on a plate $r$ on the piston-rod K, of such size as to close the chimney-damper when the piston J is not sustained by water. In other words, the closing of the damper is effected by the gravity of the weight L.

M is a valve-chest having a nozzle $s$ screwed into the wall of the cylinder I at a point below the piston J. This valve-chest is bored for the reception of the hollow cylindrical valve N, and it has the nozzles $a'$ and $b'$, into which are screwed, respectively, the waste pipe and the pipe leading to some source of water under pressure. These pipes are not shown in the drawings. The valve N has two annular grooves $e'$ and $f'$, which serve to bring into communication, under certain circumstances, the ports $g'$ and $h'$, which lead to the nozzles $a'$ and $b'$, and also to place the nozzle $s$ in communication with either of the ports $g'$ or $h'$ through the medium of the apertures $g^2$ and $h^2$, leading into the interior of the valve N, as described in the said Letters Patent.

The upper end of the valve N is slotted and in the slot is placed a lever O, fulcrumed at $i'$ to a bracket $j'$, projecting from the valve-chest M. This lever has a yoke $k'$, which straddles the collar $i$ and is pivoted to the arm $j$, which is a part of the collar, and also a yoke $A'$, which surrounds the cylinder I.

$B^3$ is a stand of any suitable character, secured to the upper section $c$ of the box C, carrying at its upper end a stud $a^3$. To this stud is fulcrumed a bent lever $C^3$, the long arm $b^3$ of which is provided with a weight $D^3$, adjustable in position and connected by a chain $E^3$ to the arm U on the piston-rod K. The said long arm of the lever has several holes, through any one of which a hook on the end of the chain may be inserted.

The short arm $c^3$ of the lever $C^3$ is slotted, the slot being denoted by $d^3$ and connected by a screw $e^3$, of suitable character, to an arm $F^3$. On this arm is a block $G^3$, adapted to be slid thereon and fastened by a set-screw $f^3$ when adjusted in position.

$H^3$ is a spindle projecting from the block $G^3$, carrying a loosely-turning roller-weight $I^3$, preferably grooved where it rests on the lever O.

When the long arm $b^3$ of the bent lever $C^3$ is raised or lowered, the roller-weight traverses the lever O.

By raising the long arm $b^3$ of the bent lever $C^3$ the roller-weight $I^3$ moves farther from the fulcrum $i'$ and the tendency of the diaphragm D and the valve N to rise is increased, the action being similar to that effected by the spring described in the said Letters Patent.

The operation of the valve N consequent upon the rise and fall of the diaphragm and the stroke of the piston J in the cylinder I to admit water to the said cylinder and allow of its discharge therefrom is identical with that of the valve in the patented invention and needs no description herein, and its movement is effected by the rolling of the weight $I^3$ along the lever O for the same purpose as that produced by the spring T in the patented invention and which is described at length in the said Letters Patent; but while the action of the weight is similar to the spring it differs in that no variation in its operation can take place by use or atmospheric changes. The action of the weight may be altered by adjustment of the screw $e^3$ in the slot $d^3$ and also by changing the hook of the chain $E^3$ to different distances from the fulcrum $i'$, as may be required by the normal quality of the draft in the chimney.

When the screw $e^3$ is once adjusted in the slot $d^3$ and the chain attached to the long arm $b^3$ of the bent lever $C^3$ at the proper distance from the stud $a^3$ to suit the normal draft of the chimney, the rolling of the weight I will perform its office as regards influencing the operation of the valve N for an indefinite period of time without alteration.

I do not confine myself to the arrangement of rolling weight and lever shown, as many modifications therein may be made without changing the result obtained.

I claim as my invention—

In an apparatus for controlling the admission of air to a furnace, the combination of a primary fluid-pressure motor, a secondary fluid-pressure motor, a valve to govern the flow of motive fluid to and from the secondary motor, a lever attached to the valve and adapted to be actuated by the primary motor, a bell-crank lever pivoted at its angle and having one end flexibly connected to the moving element of the secondary motor, and a weight attached to the other end of the bell-crank lever, and adapted to rest on and move back and forth along the valve-lever, whereby the movement of the secondary motor is restricted, substantially as specified.

GEORGE ROBERT HOUSE.

Witnesses:
WM. T. HOWARD,
CHAS. C. PARKER.